No. 720,575. PATENTED FEB. 17, 1903.
C. FREMONT.
APPARATUS FOR TESTING AND MEASURING THE STRENGTH OR RESISTANCE OF MATERIALS.
APPLICATION FILED JULY 16, 1902.

NO MODEL.

Witnesses:
Inventor
Charles Fremont
By Wm. E. Coulter
Attorney

UNITED STATES PATENT OFFICE.

CHARLES FREMONT, OF PARIS, FRANCE.

APPARATUS FOR TESTING AND MEASURING THE STRENGTH OR RESISTANCE OF MATERIALS.

SPECIFICATION forming part of Letters Patent No. 720,575, dated February 17, 1903.

Application filed July 16, 1902. Serial No. 115,780. (No model.)

*To all whom it may concern:*

Be it known that I, CHARLES FREMONT, a citizen of the Republic of France, residing at Paris, France, have invented certain new and useful Improvements in Apparatus for Testing and Measuring the Strength or Resistance of Materials, of which the following is a specification.

This invention relates to an apparatus which will permit of testing and measuring the strength or resistance of finished articles and of materials wherein stamps are employed to produce blows or shocks upon the materials or articles to be tested. These materials are generally of metal or alloys of metals which can be tested in the form of bars or in various forms and sections.

Whatever may be the constitution or shape of the materials to be tested this improved measuring apparatus renders it possible to ascertain their degree of resistance.

The apparatus comprises a stamp or drop-hammer provided with a punch or head which falls and effects the necessary blow to determine the resistance-shock of the material placed upon an ordinary matrix or support.

The apparatus also comprises a registering device which indicates the amount of work performed in producing breakage or bending by the blow.

Figure 1:
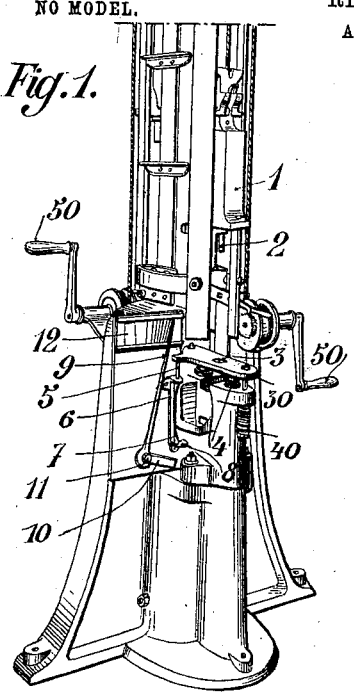
Figure 4:
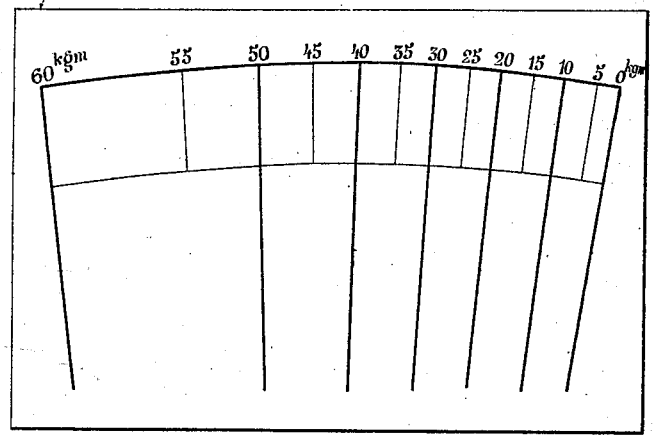
Figure 2:
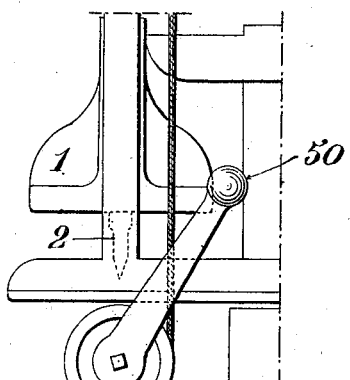
Figure 3:
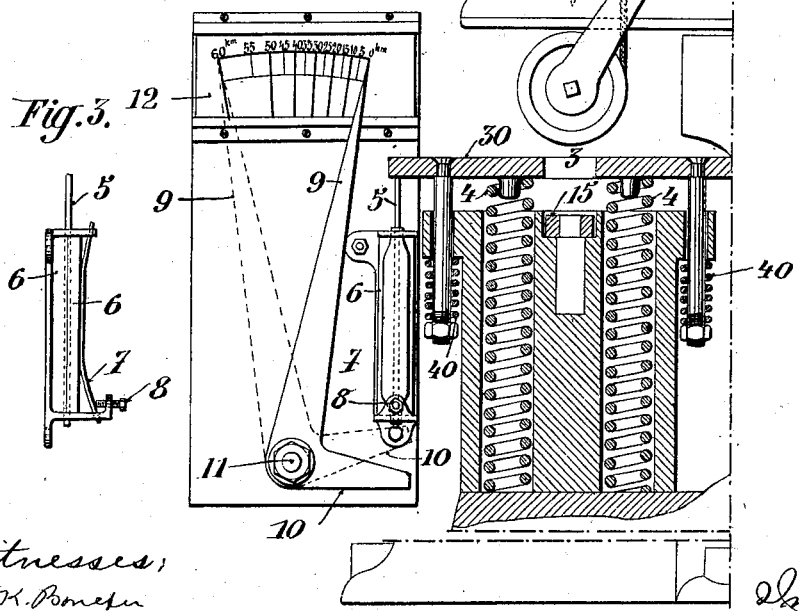

In the accompanying drawings, in which like figures indicate like parts, Figure 1 is a perspective view of the apparatus provided with the indicating or measuring device. Fig. 2 is a side elevation, partly in vertical section, showing the platform and scale. Fig. 3 is a side elevation of a form of intermediate brake device. Fig. 4 represents the scale-dial, upon which the quantity of work expended is indicated by a pointer.

The stamp or drop-hammer 1 carries a punch 2, which is destined to come in contact with and bend or break the article or bar to be tested, the latter being placed upon the support 15 previous to the fall of the hammer. After the breakage of the bar the hammer still possesses a force which is taken up by springs 4, the latter being compressed proportionately to the amount of work expended after the breakage of the bar; but as the springs expand immediately it is necessary to have an index which follows exactly the compression of the springs 4 and records their momentary maximum compression. As the force of impact of the hammer is very great, the pointer employed for marking the extreme limit of travel or compression of the springs is operated by such a large force that it is liable to overflow and indicate a compression greater than the real compression. In order to avoid this error, they are strongly compressed; but then the friction of a pointer under these conditions requires, in order to be overcome, a large expenditure of work, which is taken from the power of the hammer. It is this which is the first cause of error. Furthermore, this friction varies, and after several operations the friction diminishes rapidly, and the pointer is then projected farther than before for the same blow of the hammer under the same conditions, and thus a second error occurs. As the compression of the springs 4 cannot be very great and as it should be divided into many parts to permit of reading to a close approximation the expenditure of work, it is necessary to amplify the movement of the spring, and it follows that an index conforming to these conditions has necessarily a great volume and a great weight and absorbs so much more power. The improved apparatus according to this invention remedies these defects.

This apparatus for measuring and registering the resistance of materials to shocks is constituted mainly by the following three parts:

*a.* A metallic friction rod or tube 5 of very light weight, made of hardened steel, for example.

*b.* A brake composed, for example, of two blocks of wood 6, between which slides with slight friction the tube 5 upon a bed or packing of felt, cloth, flexible or soft leather, or other analogous material for distributing the friction over the whole surface in contact with the tube. A flat spring 7, regulated by a screw 8, produces a uniform and sufficient pressure upon the block 6, so that the sliding of the tube 5 prevents the hammer 1 by slight friction from exceeding the limit of movement of the springs 4.

*c.* A lever 9, independent of the tube 5, which multiplies the movement of the springs 4 by three or four times, for example, and permits of an easy reading of the work expended upon a scale 12. This lever is preferably of the bell-crank form, and has a long arm 9 arranged, preferably, in the vertical direction, while its short arm 10 is relatively heavy and horizontal, so as to displace the center of gravity of the lever and to insure that it always shall be to the right of the axis of oscillation 11, so as not to interfere with the movement of the tube 5, which it never touches, even when the latter reaches the limit of its travel, which corresponds to the extreme compression of the springs 4.

When the hammer 1 falls, it compresses the springs 4 in proportion to the amount of *vis viva* left after the breakage of the article to be tested placed upon the support 15. The tube 5 moves downward positively or exactly in accordance with the compression of the springs 4 without exceeding it, owing to the friction brake-blocks 6, and affords an accurate index to the extent of compression of the springs 4. In order to measure this compression, it is sufficient to draw the arm 9 of the bell-crank lever toward the left until the end of its lower arm 10 comes in contact with the tube 5, and to read on the graduated dial 12 the figure indicated by the pointer 9 in order to ascertain the amount of *vis viva* which remained in the hammer after the breakage of the bar. As the amount of the initial force is known, being equal to the product of the height of fall of the hammer multiplied by its weight, the work expended in effecting the breakage of the bar can be immediately ascertained by deducting the amount indicated by the pointer from the total power applied. As the extent of fall of the hammer is preferably constant in order to avoid the necessity of working out the result, the dial 12 may be graduated, so that the pointer 9 will give at once the result sought. Thus a single reading gives the required figure, which is indicated by the pointer 9 of the lever. After reading this result the apparatus is brought back to zero by pressing upon the long arm of the lever in order to cause the arm 10 to press the tube 5 upward against the under side of the plate 30, which is sustained by the springs 4 and 40, whereupon the apparatus is ready for a fresh operation. The tube 5 being very light offers only a very small resistance and requires only a little friction to hold it, while it is not driven forward by momentum, but only to the exact extent corresponding to the power exerted, and consequently it acts positively and cannot produce the errors referred to above. Further, the bell-crank lever which multiplies the extent of movement of the springs 4 being independent of the tube 5 is not thrown forward during the shock, but effects the multiplication exactly and can be used to effect the return of the tube 5 to its initial position.

What I claim as my invention, and desire to secure by Letters Patent, is—

1. Apparatus for testing metal and other articles comprising a drop-hammer a rigid work-support a spring-supported plate intermediate the work-support and the hammer in combination with a scale-pointer and a positively-acting pointer-operating mechanism intermediate the spring-supported plate and the pointer substantially as described.

2. Apparatus for testing metal and other articles comprising a drop-hammer a rigid work-support a spring-supported plate intermediate the work-support and the hammer in combination with a frictionally-held rod the upper end of which is normally in contact with the under surface of the plate and an independently-mounted bell-crank lever one arm of which is adapted to be brought in contact with the lower end of the rod after the hammer has dropped while its other arm acts as a pointer on a graduated scale substantially as described.

3. In apparatus of the kind described a frictionally-supported transmission device intermediate the spring-supported plate and the pointer comprising a light rod a brake-block in contact with said rod and means for pressing the block upon the rod substantially as described.

4. Apparatus for testing metal and other articles comprising a drop-hammer a work-support with an intermediate spring-supported plate 30 a rod 5 frictional brake-block 6 and a bell-crank pointer-lever 9 10 substantially as described.

In testimony whereof I have signed my name to this specification in the presence of two subscribing witnesses.

CHARLES FREMONT.

Witnesses:
 ALBERT MAULVAULT,
 EDWARD P. MACLEAN.